United States Patent Office 2,800,466
Patented July 23, 1957

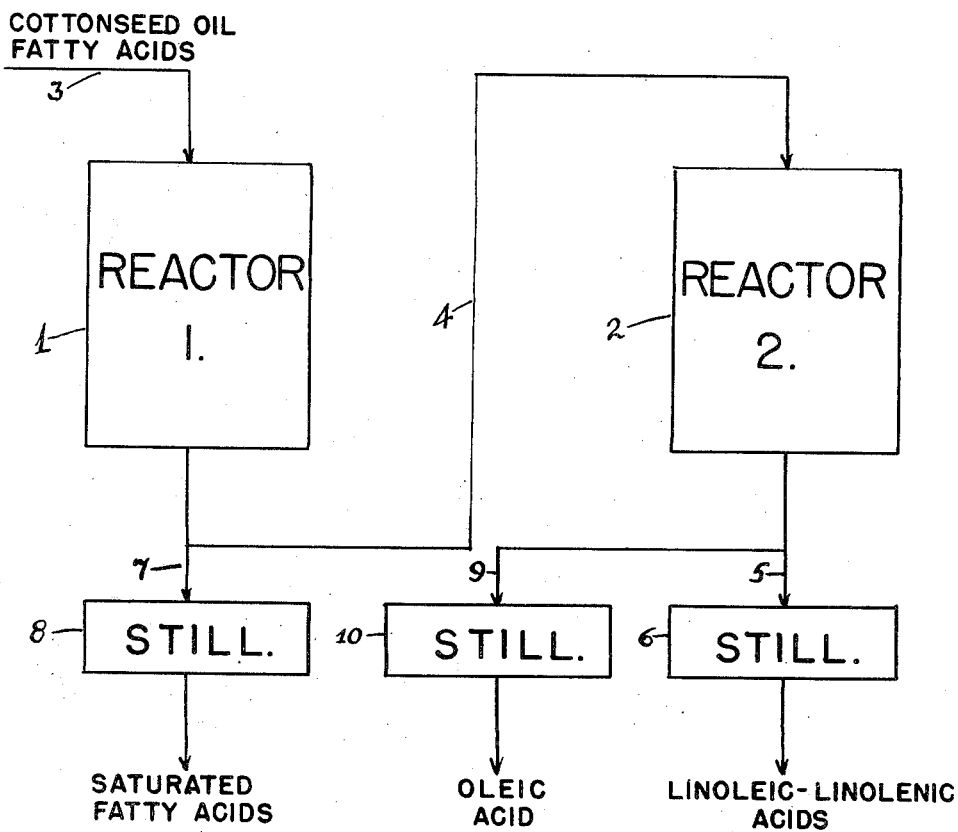

2,800,466

PROCESS FOR TREATING A MIXTURE OF SATURATED AND UNSATURATED FATTY ACIDS WITH EXPANDED UREA

Ludwig Rosenstein and Manuel H. Gorin,
San Francisco, Calif.

Application September 30, 1952, Serial No. 312,220

1 Claim. (Cl. 260—96.5)

This is a continuation-in-part of our application Serial No. 152,179 filed March 27, 1950, now abandoned.

This invention refers to the fractionation of high molecular weight straight chain fatty acids.

High molecular weight straight chain fatty acids can react with urea to form solid-phases which are stable at one temperature and can be decomposed at another, higher temperature, liberating the fatty acids and leaving solid urea. Moreover, the stability and ease of formation of these solid compounds varies with the molecular weight of the fatty acids and with the degree of unsaturation. In general, the higher the molecular weight, the more stable and more easily formed are the solid compounds with urea. Also, the greater the number of double bonds, the less stable and the more difficult to form are the solid compounds.

Ordinary urea reacts far too slowly with fatty acids for practical purposes. The addition of liquids other than water, which are solvents for urea, accelerate the action to a practical point.

We have found that we can produce a certain new type of urea which will react rapidly with the high molecular weight fatty acids to form solids without the aid of an accelerator. We name this new type of urea "expanded urea," and will give directions for its production, and evidence that it differs fundamentally from ordinary urea, and not merely by its state of fineness.

We have further found that the fatty acids contained in solid combination with urea can be readily recovered by contacting the solids with a liquid which is a solvent for the fatty acids but not for urea, and then raising the temperature; such a solvent is referred to herein and in the claim as a neutral solvent. Different fatty acids form solids having different decomposition temperatures, and advantage can be taken of this as another means of achieving selection. In no case must the temperature attain the melting point of the urea present.

Assuming for the moment that we have an expanded urea as thus far defined, we will describe a process of separation as applied to a commercial material, namely cottonseed oil fatty acids; by way of illustration, cottonseed oil fatty acids having approximately the composition:

|  | Percent |
| --- | --- |
| Saturated fatty acids (stearic, palmitic acid, etc.) | 33 |
| Unsaturated fatty acids: |  |
|    Oleic acid | 23 ⎫ 67 |
|    Linoleic and Linolenic acid | 44 ⎭ | were dissolved in hexane to make a 40% solution by weight. Either stronger or weaker solutions might be used, and the 40% strength was chosen because this particular sample of fatty acid gives a low enough viscosity at this concentration to allow easy handling.

We have found that approximately 1250 pounds of expanded urea is required to combine with the saturated fatty acids in 1,000 pounds of cottonseed oil fatty acids, and about 850 pounds to combine with the oleic acid therein.

The operation will be explained in conjunction with the apparatus shown in the accompanying drawing which is a diagrammatic representation of suitable apparatus.

Referring to the drawing, we have indicated reaction vessels 1 and 2 having an inlet pipe 3 at the top of vessel 1 with pipe 4 extending from the bottom of vessel 1 to the top of vessel 2. Pipes 5 and 9 lead, respectively, to stills 6 and 10 from vessel 2, while pipe 7 leads to still 8 from vessel 1.

1250 pounds of an expanded urea were charged into vessel 1, and 850 pounds of the same into vessel 2.

The fatty acid solution was introduced into vessel 1 through pipe 3 at a rate such that its residence time in contact with the expanded urea was approximately 20 minutes at approximately 25° C. Flow was continued until 1,000 pounds of fatty acids had been fed. The effluent from vessel 1 was transferred through pipe 4 to vessel 2 and the effluent from vessel 2 was taken through line 5 to a conventional still 6, wherein the hexane was separated from the remaining fatty acids. In vessel 1, the saturated fatty acids were largely taken up by the expanded urea along with some of the unsaturated fatty acids, while in vessel 2 the oleic acid was largely absorbed along with the residual amounts of saturated fatty acids as well as some of the linoleic and linolenic acids. The residue issuing through line 5 was largely the linoleic and linolenic acids in solution in hexane. This solution was charged to still 6 wherein the hexane was boiled off and the linoleic and linolenic acids fraction was recovered. Fatty acid feed was now cut off and the feeding of a hot, neutral solvent commenced. In the operation under discussion, 2000 pounds of liquid hexane was passed at about 110° C. and 65 p. s. i. g. at an average contact time of 15 minutes through the urea in vessel 1 and through line 7 into a still 8, where the hexane was removed and the saturated fatty acid fraction having an iodine number of about 34 recovered as bottom. Similarly, 1500 pounds of liquid hexane was passed through vessel 2 under pressure at about 95° C. and a contact time of about 15 minutes. The effluent from vessel 2 was delivered through line 9 to the still 10 wherein hexane was removed and the oleic acid fraction was recovered. All hexane coming from the stills may be returned for use.

Expanded urea such as is left in vessel 2 is well suited to serve as the starting expanded urea referred to in lines 48 and 49 of column 1.

The sequence of operations outlined above is particularly useful for the purposes intended since the expanded urea formed by decomposing urea-oleic acid-solid phase at 95° C. is more reactive than that formed by decomposing the adduct of saturated fatty acids with urea at 110° C. After the described steps the system comprising the apparatus and reagents is in a different condition than at the start. Whereas the process was begun with an expanded urea of uniform and sufficient degree of activity this has now been altered to a system characterized by containing in separate vessels, expanded ureas of different degrees of reactivity. The effect of this change on the further operation is to enhance the selectivity; or in other words, to sharpen the fractionation. Repetition of the described steps will therefore result in a fraction of the saturated fatty acids containing less unsaturated fatty acids than before; and in an oleic acid fraction containing less saturated fatty acids than before. The process now has become one wherein high molecular weight fatty acids in neutral solvent are contacted successively with a first mass of expanded urea as the sole reagent to form first urea-fatty acid adduct, and then contacting the remaining fatty acids in neutral solvent with a second mass of expanded urea as the sole reagent having an activity greater than that of the first reactive urea to form a second adduct.

While in this case the difference in degrees of activity of the two separate masses of reactive urea was produced by varying the temperature of decomposition at a fixed time, this result can likewise be achieved by varying the time at a fixed temperature above the decomposition temperature of the given adduct. This will be illustrated by a later example.

To illustrate in detail the operation of the process after the two different masses of expanded urea have been created, we proceed as follows:

As previously described, a 40% solution by weight of the same cottonseed oil fatty acids in commercial hexane is introduced through pipe 3 into vessel 1 at a rate so that contact time with the first expanded urea is approximately 20 minutes at 25° C. Substantially all the saturated fatty acids having from 10 to 20 carbon atoms will be adducted by the 1250 pounds of the first expanded urea and very little of the unsaturated fatty acids will be adducted. When 1000 pounds of total fatty acids have been thus contacted in vessel 1, the clear inffluent from this vessel is transferred through pipe 4 to vessel 2 where it is allowed to remain in contact with the second mass of expanded urea for about 20 minutes at 25° C. During this time the 850 pounds of second expanded urea adducts the small amount of remaining saturated fatty acids, substantially all the oleic acid, and minor amounts of linoleic and linolenic acids. The residual hexane solution is passed through line 5 to still 6 where hexane is removed by distillation and a residue consisting substantially of linoleic and linoleic acids is obtained. From the 1000 pounds of the particular cottonseed oil fatty acids used, this residue weighs 485 pounds and has an iodine number of 172, indicating that is consists substantially of linoleic acid with small amounts of oleic and linolenic acids. Fatty acid feed is now cut off and the feeding of a hot, neutral solvent is commenced. In the operation under discussion, 2000 pounds of liquid hexane is passed at about 110° C. and 65 p. s. i. g. at an average contact time of 15 minutes through the adduct in vessel 1 and through line 7 into a still 8, where the hexane is removed and the saturated fatty acids fraction recovered as bottoms. These bottoms from still 8 weight 327 lbs. with an iodine number of 16. It consists largely of stearic acid with minor amounts of lauric, myristic, palmitic, etc. acids and with a minor amount of unsaturated fatty acids. Similarly, 1500 pounds of liquid hexane is passed through the adduct in vessel 2 under pressure at about 95° C. and a contact time of about 15 minutes. The effluent from vessel 2 is delivered through line 9 to still 10 wherein hexane is removed and the oleic acid fraction is recovered. The bottoms from still 10 weigh 184 lbs. and have an iodine number of 94. It consists largely of oleic acid with minor amounts of linoleic acid. The content of saturated acids in this fraction is very small and is not determined.

While we have described the process as applied to one fatty acid mixture, we similarly have used the complex-forming properties of urea under appropriate temperatures and times to separate the different fatty acids from rosin acids as they occur, for example, in tall-oil. The operations on tall-oil parallel those described except that an oleic acid fraction is adducted in vessel 1, a linoleic acid fraction in vessel 2, and the unreacted residue from still 6 consists substantially of rosin acids, as these do not adduct with urea.

The process has been described as using hexane, but it will operate equally well with any neutral solvent. By "neutral solvent," we mean a hydrocarbon or chlorinated hydrocarbon which is a solvent for high molecular weight fatty acids but not for urea, and which does not itself combine with urea to form a solid under the described conditions. Suitable neutral solvents are iso-octane, petroleum ether, benzol, toluol, cyclo-hexane, chlorinated hydrocarbons such as carbon tetrachloride, methylene chloride, trichlorethylene, etc. etc.

All details of apparatus such as valves, pumps, filter media, etc. have been omitted from the drawing as these are well-known to those skilled in engineering and can readily be supplied. It will be noted that the number of separate steps can be multiplied and that various devices well-known to those skilled in the art can be utilized to practice the process continuously and utilizing either parallel flow or countercurrent flow.

Expanded urea can be made in a number of different ways. The following is a broad statement of the principles involved in making expanded urea.

Ordinary urea is first caused to react with a suitable high molecular weight fatty acid or suitable linear hydrocarbon and with the aid of a urea solvent other than water to form a solid phase, which is then removed by filtration or other convenient means and washed with a neutral solvent. It is then decomposed by suspending in a neutral solvent and raising the temperature sufficiently to decompose the solid phase but not melt the urea. By "neutral solvent," we mean one that is not a solvent for urea, but is a solvent for the other component or components of the urea-solid phase which are released upon elevation of the temperature. At an elevated temperature, the solid phase will separate into its components; the urea will remain as a finely divided solid and the other component or components will go into solution in the neutral solvent. The solid urea is then removed, as by filtration, and may be washed with neutral solvent. The urea so obtained is the expanded urea of this invention; it is a light and fluffy powder and will be found to be readily reactive towards certain fatty acids and hydrocarbons without the aid of any added accelerator. The following examples are set forth as illustrative of the preparation of expanded urea, but the invention is not limited thereto.

*Example 1.—Preparation of expanded urea with a pure fatty acid*

Sufficient commercial lauric acid was dissolved in a mixture of 100 volumes of iso-octane and approximately 16 volumes of anhydrous methanol, to make a solution of approximately 10% lauric acid by weight. To this, approximately 3.3 parts by weight of ordinary commercial urea were added for each weight unit of lauric acid. The mixture was agitated at ordinary room temperature for about one hour. The solid was filtered, washed with neutral solvent and suspended in toluol; the temperature was then raised to the boiling point of toluol (110° C.) and maintained for about 15 minutes. The liquid phase was removed while hot; the urea was collected and washed with hot toluol. The filtrate from the urea can be used repeatedly to make additional batches of expanded urea.

*Example 2.—Preparation of expanded urea with a hydrocarbon*

Sufficient paraffin wax (M. P. 45° C.) was dissolved in a methanol-toluol mixture containing about 30% by volume methanol to make a 20% solution. To this was added 2.4 weights of urea per weight of paraffin wax. The mixture was agitated one hour at 19°–20° C. The solid phase was filtered, washed with neutral solvent and then suspended in toluol. It was raised to the boiling point (110° C.) for about thirty minutes and then filtered hot. The solid phase was expanded urea, and it is of especial interest to note that this expanded urea, prepared by using a hydrocarbon, was also active towards high molecular weight fatty acids. Conversely, we have found that our expanded urea, prepared by using a fatty acid, will form a solid phase without the need of an accelerator, with hydrocarbons capable of forming, under suitable and known conditions, a solid-phase with ordinary urea.

Expanded urea can also be made by a direct precipitation of the urea-organic complex from a urea solvent which also dissolves fatty acids, and then decomposing the solid complex, as previously described. The methanol accelerator used in the two preceding examples is convenient in that it reduces the time necessary to form the urea-fatty acid or paraffin solid phase. However, this solid phase can also be formed by a long continued contact of ordinary urea with suitable fatty acids or hydrocarbons in solution in neutral solvent. Thermal decomposition of solid-phase thus formed and suspended in neutral solvent also gives rise to expanded urea. The following example is cited to show this.

*Example 3.—Preparation of expanded urea without the use of an accelerator*

A quantity of cottonseed fatty acid was dissolved in sufficient hexane to make a solution containing 200 grams fatty acid per litre. To 250 ml. of this solution were added 20 grams of Merck reagent urea. The temperature was raised to 40° C. and the material kept well agitated in a closed vessel for approximately twelve hours. At the end of this period the solid phase was removed by filtration, washed with warm hexane and finally decomposed at 110° C. with boiling toluol for a period of fifteen minutes. The solid urea was filtered and washed with hot toluol. It was found to consist of expanded urea and capable of rapid interaction to form solid phase with fatty acids and with linear hydrocarbons such as those occurring in paraffin wax.

It will be obvious to those skilled in the art that this process of making expanded urea can be continuous and that high molecular weight fatty acids other than lauric acid, and that linear hydrocarbons other than paraffin wax, can be employed.

*Example 4.—*Urea in four different forms was used. These were:

A. Expanded urea prepared as described in Example 1.
B. Expanded urea prepared as described in Example 1 except that it was maintained in toluol at 110° C. for 150 minutes instead of 15 minutes.
C. Merck reagent urea ground to an impalpable powder.
D. Merck reagent urea.

For the test substance, we used a commercial product known as "Double Distilled Cottonseed Fatty Acids." This material has the following approximate composition:

| | |
|---|---|
| Saturated fatty acids (stearic, palmitic acid, etc.) | 33% |
| Unsaturated fatty acids: | |
| Oleic acid | 23% } 67% |
| Linoleic and Linolenic acid | 44% |
| Acid number | 200 |
| Iodine number | 105 |
| Titer | 38° C. |

Solution of this material was made up in hexane to contain 50 grams per 250 ml. solution; equal amounts of the four forms of urea were introduced into separate equal portions of the fatty acid-hexane solutions. The suspensions were kept well agitated in closed vessels at 20° C. At various times, samples of the clear liquid were taken and the fatty acid content thereof determined by titration with standard KOH in the usual manner. From the results, the percent fatty acids which had combined was calculated. Table I gives the results:

TABLE I

| Expanded Urea A | | Expanded Urea B | | Ground Urea C | | Reagent Urea D | |
|---|---|---|---|---|---|---|---|
| Elapsed Time, minutes | F. A. to Solid Phase, Percent [1] | Elapsed Time, minutes | F. A. to Solid Phase, Percent [1] | Elapsed Time, minutes | F. A. to Solid Phase, Percent [1] | Elapsed Time, minutes | F. A. to Solid Phase, Percent [1] |
| 14 | 20 | ---- | ---- | 15 | 0 | 16 | 0 |
| 34 | 27.6 | ---- | ---- | 34 | 0 | 33 | 0 |
| 52 | 29.4 | 44 | 16.0 | 54 | 0 | 51 | 0 |
| 76 | 33.6 | 67 | 17.8 | 75 | 0 | 72 | 0 |
| 94 | 33.2 | 97 | 19.8 | ---- | ---- | ---- | ---- |
| [2] 704 | 41.1 | ---- | ---- | [2] 699 | 11 | [2] 689 | 2.4 |
| [2] 2,040 | 43.3 | ---- | ---- | ---- | ---- | ---- | ---- |
| [2] 3,600 | 43.2 | ---- | ---- | ---- | ---- | ---- | ---- |

[1] Mol percent.
[2] Allowed to stand without agitation.

Certain facts are apparent from these data. In the case of expanded urea (A), prepared by 15 minute exposure to 110° C., 33% of the fatty acids, had reacted after 76 minutes, while neither the finely ground urea (C), nor the ordinary urea (D), showed any measurable reaction. However, after a long period of standing, the finely ground urea (C) reacted with 11% of the fatty acids, while the reagent urea (D) reacted with 2.4% of the fatty acids. These amounts were taken up by expanded urea (A) in less than 5 minutes. Comparing the expanded urea (B), prepared with 150 minutes contact at 110° C., we see that it is approximately one-sixth as reactive as expanded urea (A), the material which had only 15 minutes thermal decomposition, but it is still many times as reactive as the finely ground urea (C), on the basis of the time required for conversion. Further with regard to expanded urea (A): After 33% of fatty acids had been adducted (corresponding to 33% saturated fatty acids present) the reaction rate becomes very slow, indicating that this expanded urea is far more reactive toward the saturated fatty acids than toward the unsaturated.

The fact that urea with different degrees of reactivity within the range of practical use can be prepared is of importance in the development of processes for separating the components of fatty acid mixtures or of hydrocarbons. The most reactive urea is by no means always the most desirable. A highly reactive urea will combine with fatty acids or hydrocarbons so fast that it is likely to set up as a solid mass and, moreover, a control of the reaction so as to achieve selectivity is almost impossible unless the reaction time is slow enough so that selectivity can be accomplished by limiting the time of contact. Towards any given sample of expanded urea, the saturated fatty acids are most reactive; the unsaturated acids with a single double bond less so; and the unsaturated acids with multiple double bonds least. The following examples additionally illustrate the achievement of a selective separation of such a mixture of saturated and unsaturated fatty acids.

*Example 5.—*Samples of the expanded urea previously designated A and B (Table I), were brought into contact with a hexane solution of cottonseed fatty acids (50 g. fatty acids in 250 ml. total volume) for 15 minutes. The solid phase was filtered, washed with hexane and finally decomposed with water whereby the fatty acids were liberated. Their melting points and amounts were determined:

| | ° C. | Percent F. A. in Solid Phase |
|---|---|---|
| Melting point of fatty acids from Urea A | 40 | 10.1 |
| Melting point of fatty acids from Urea B | 47 | 5.3 |

*Example 6.—*40 grams of a commercially available "Double Distilled Cottonseed Fatty Acids" of the composition given above were dissolved in 100 cc. of commercial hexane. Five 24 gram portions of an expanded urea, prepared by contacting a urea-cottonseed fatty acid complex with boiling toluol for about 90 minutes, were added successively to this hexane solution of cottonseed fatty acids. After each addition of expanded urea the mixture was agitated for 30 minutes at 20° C., then filtered, washed with hexane and evaporated at room temperature back to its original volume. In each case the solid phase was decomposed with water and the fatty acids extracted with benzene and recovered by evaporation of the benzene and their titer determined. The results are given in Table II:

TABLE II

| Addition of Urea | Fatty Acids Taken Up, Percent | Titer of Fatty Acids Obtained, ° C. |
|---|---|---|
| 1st | 11.5 | 48.8. |
| 2nd | 11.5 | 48.7. |
| 3rd | 9.5 | 48.1. |
| 4th | 1.75 | (soft solid.) |
| 5th | 2.25 | (soft solid.) |

It is noteworthy that the reaction proceeded rapidly and gave a high titer product of apparently nearly constant composition until about 32.5% of the fatty acids were removed, after which the rate of reaction and the titer of the product dropped sharply. Since the saturated fatty acid content of the cottonseed fatty acids was 33%, it is evident that these acids are taken up very selectively and much more rapidly than the unsaturated acids by this particular expanded urea.

Urea B of Example 5 was less reactive, as shown by the lesser amount of fatty acids recovered, but while the less reactive urea has taken up only approximately half as much of the fatty acids, the melting point of the acids taken up was 7° C. higher, indicating that in the 15 minutes the less reactive urea had time to combine only, or nearly so, with higher melting fatty acids whereas the more reactive urea had combined with these and as well with some having lower melting points.

While the above Examples 5 and 6 point to differences of reactivity of expanded ureas achieved by changing the times of contact with hot toluol, similar differences of reactivity can be achieved by changing the temperatures. In the latter case, however, another phenomenon comes into consideration. The solid phases formed between urea and fatty acids or hydrocarbons have different degrees of temperature stability; in other words, different decomposition temperatures; and to achieve complete liberation of fatty acids or hydrocarbons from a given solid phase, the decomposition temperature of the highest member must be exceeded; hence partial and selective decomposition can be achieved in the temperature range below the decomposition temperature of the most stable adduct.

While the difference in reaction rates towards high molecular weight fatty acids of expanded urea and ordinary urea, whether finely divided or not, are sufficient to distinguish expanded urea from ordinary urea, the expanded form may be additionally characterized by its unusually low bulk-density compared with that of ordinary urea. Expanded urea has a bulk-density of approximately 0.45 gram per cubic centimeter, and in any case not exceeding 0.50 gram per cubic centimeter. Ordinary urea of either reagent or commercial grade after grinding has a bulk-density of approximately 0.75 gram per cubic centimeter. No degree of grinding alters it to less than 0.70 gram per cubic centimeter. Bulk density was measured by adding successive portions of the powder to a 50 cc. graduated cylinder, being careful to jar and tap the cylinder after each addition. When approximately 20 cc. had been added, the cylinder was jarred and tapped till no further change in volume occurred. The weight and volume were then recorded. The ratio of weight to volume is the bulk-density.

The term "expanded urea" as used in this specification and in the claim defines a light and fluffy urea having a bulk-density not exceeding 0.50 gram per cubic centimeter and being capable, when used as the sole reagent, of showing substantial adduct formation within one hour with saturated fatty acids having twelve or more carbon atoms and being linear.

When urea combines with fatty acids, or hydrocarbons, these latter penetrate the crystal lattice and cause it to expand, thus changing the fundamental dimensions. We believe that when the solid phase is decomposed as described, the expanded structure is maintained. Suitable substances can now more readily penetrate the structure, hence the reactivity of our expanded urea. Such expanded urea loses its reactivity on long standing at ordinary temperature or more rapidly at higher temperature, and we interpret this as the gradual return of the expanded structure to the normal structure of crystalline urea. In other words, the expanded urea is metastable and tends to return to the stable form.

The process of this invention can be employed to remove oleic and linoleic acids from fatty acids such as those from soy bean and linseed oil, leaving behind fractions consisting of linolenic and fatty acids of still higher unsaturation.

We claim:

In a process for fractionating fatty acids from their solution in a neutral solvent containing saturated and unsaturated fatty acids of more than eleven carbon atoms, the step of contacting said solution with expanded urea in the form of a light and fluffy powder having a bulk density not exceeding 0.5 gram per cc., as the sole reagent having a high degree of selectivity for saturated fatty acids of more than eleven carbon atoms to form an adduct with substantially only the saturated fatty acids; said expanded urea having been made to be highly selective for saturated fatty acids by decomposing an adduct of urea and saturated fatty acid of more than eleven carbon atoms by heating said adduct suspended in a neutral solvent at a temperature of about 110° C. for a time between 90 minutes and 150 minutes.

References Cited in the file of this patent

UNITED STATES PATENTS

| 2,518,677 | Garner et al. | Aug. 15, 1950 |
| 2,577,202 | Lien et al. | Dec. 4, 1951 |
| 2,596,344 | Newey et al. | May 13, 1952 |
| 2,613,204 | Fetterly | Oct. 7, 1952 |
| 2,634,261 | Fetterly | Apr. 7, 1953 |
| 2,670,343 | Fetterly | Feb. 23, 1954 |